(12) United States Patent
Koster et al.

(10) Patent No.: US 8,143,344 B2
(45) Date of Patent: Mar. 27, 2012

(54) METHOD OF MAKING A SILICA/ELASTOMER COMPOSITE

(75) Inventors: Georges Koster, Steinfort (LU); Wolfgang Lauer, Mersch (LU)

(73) Assignee: The Goodyear Tire & Rubber Company, Akron, OH (US)

(*) Notice: Subject to any disclaimer, the term of this patent is extended or adjusted under 35 U.S.C. 154(b) by 239 days.

(21) Appl. No.: 12/629,983

(22) Filed: Dec. 3, 2009

(65) Prior Publication Data

US 2011/0136970 A1  Jun. 9, 2011

(51) Int. Cl.
- *C08L 9/00* (2006.01)
- *C08K 3/00* (2006.01)
- *C08G 63/48* (2006.01)
- *B60C 1/00* (2006.01)

(52) U.S. Cl. ........ 524/571; 524/573; 524/574; 524/575; 524/575.5; 524/576

(58) Field of Classification Search .......... 523/204, 523/207, 209, 210, 216, 218; 524/571, 575, 524/578, 573, 574, 575.5, 576
See application file for complete search history.

(56) References Cited

U.S. PATENT DOCUMENTS

| | | | |
|---|---|---|---|
| 2,885,366 A | 5/1959 | Iler | 252/313 |
| 2,913,419 A | 11/1959 | Alexander | 252/313 |
| 3,840,382 A * | 10/1974 | Burke | 106/431 |
| 3,895,035 A * | 7/1975 | Berg et al. | 524/432 |
| 3,922,240 A * | 11/1975 | Berg et al. | 523/334 |
| 3,929,707 A * | 12/1975 | Berg et al. | 523/210 |
| 3,945,978 A * | 3/1976 | Berg et al. | 523/210 |
| 3,998,778 A * | 12/1976 | Berg et al. | 524/552 |
| 4,073,755 A * | 2/1978 | Berg et al. | 523/334 |
| 4,138,375 A * | 2/1979 | Berg et al. | 523/334 |
| 4,514,231 A * | 4/1985 | Kerner et al. | 106/445 |
| 5,024,826 A | 6/1991 | Linton | 423/335 |
| 5,300,569 A * | 4/1994 | Drake et al. | 525/78 |
| 6,005,027 A * | 12/1999 | Guillet et al. | 523/209 |
| 6,221,326 B1 | 4/2001 | Amiche | 423/335 |
| 6,245,860 B1 | 6/2001 | Materne et al. | 525/331.8 |
| 6,448,325 B2 | 9/2002 | Visel et al. | 524/492 |
| 6,626,216 B2 | 9/2003 | Minagoshi | 152/209.4 |
| 6,780,922 B2 * | 8/2004 | Huynh-Tran et al. | 524/501 |
| 7,408,005 B2 | 8/2008 | Zheng et al. | 525/243 |
| 2008/0045643 A1* | 2/2008 | Henning et al. | 524/493 |
| 2011/0136938 A1* | 6/2011 | Koster et al. | 523/218 |

OTHER PUBLICATIONS

Sartomer Application Bulletin, Sartomer Company, "Ricon® 184 Maleinized Polybutadiene," Aug. 2004.

* cited by examiner

*Primary Examiner* — Susan W Berman
(74) *Attorney, Agent, or Firm* — John D. DeLong

(57) ABSTRACT

The present invention is further directed to a method of producing a particulate composite of silica and elastomer comprising the steps of
- dispersing a diene based elastomer in a hydrophobic liquid to form an elastomer dispersion;
- mixing the elastomer dispersion with an aqueous solution of an alkali metal silicate to form a mixture;
- adding a precipitating agent to the mixture to precipitate a porous silica onto the dispersed elastomer to form a particulate composite of silica and elastomer comprising a porous silica shell at least partially surrounding a core of diene based elastomer; and
- optionally adding a separating agent to remove the hydrophobic liquid from the particulate composite.

11 Claims, No Drawings

METHOD OF MAKING A SILICA/ELASTOMER COMPOSITE

FIELD OF THE INVENTION

The present invention relates to a method of producing the particulate composite of silica and elastomer.

BACKGROUND OF THE INVENTION

Silica is increasingly used as a replacement for carbon black in tire rubber compositions to improve the rolling resistance of the tires. Interaction of silica with the elastomers in the tire rubber is desirable to further improve rolling resistance. Use of coupling agents leads to better interaction, but with reduced processablity of the rubber composition and at increased cost. There is therefore a need to improve the interaction between silica and elastomers in rubber compositions.

SUMMARY OF THE INVENTION

The present invention is further directed to a method of producing a particulate composite of silica and elastomer comprising the steps of dispersing a diene based elastomer in a hydrophobic liquid to form an elastomer dispersion;

mixing the elastomer dispersion with an aqueous solution of an alkali metal silicate to form a mixture;

adding a precipitating agent to the mixture to precipitate a porous silica onto the dispersed elastomer to form a particulate composite of silica and elastomer comprising a porous silica shell at least partially surrounding a core of diene based elastomer; and optionally adding a separating agent to remove the hydrophobic liquid from the particulate composite.

DETAILED DESCRIPTION OF THE INVENTION

There is disclosed a method of producing a particulate composite of silica and elastomer comprising the steps of dispersing a diene based elastomer in a hydrophobic liquid to form an elastomer dispersion;

mixing the elastomer dispersion with an aqueous solution of an alkali metal silicate to form a mixture;

adding a precipitating agent to the mixture to precipitate a porous silica onto the dispersed elastomer to form a particulate composite of silica and elastomer comprising a porous silica shell at least partially surrounding a core of diene based elastomer; and optionally adding a separating agent to remove the hydrophobic liquid from the particulate composite.

The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

In a first step of the method, a diene based elastomer is dispersed in a hydrophobic liquid to form an elastomer dispersion.

Representative diene based elastomers suitable for dispersion are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one embodiment, the diene based elastomer to be dispersed in a hydrophobic liquid is in the form of an elastomer latex. In one embodiment, the diene based elastomer to be dispersed is a liquid elastomer. In one embodiment, the diene based elastomer to be dispersed is a water soluble elastomer.

In one embodiment, the diene based elastomer to be dispersed is a maleinized styrene-butadiene copolymer elastomer having a molecular weight Mn in a range of from 3000 to 15000. Suitable maleinized styrene-butadiene is available for example as Ricon® 184 from Sartomer.

The diene based elastomer is dispersed in a hydrophobic liquid to form an elastomer dispersion. In one embodiment, the hydrophobic liquid is an oil. Suitable oils include mineral oils and vegetable oils.

In dispersing the diene based elastomer in the hydrophobic liquid to form an elastomer dispersion, a high shear environment is created to ensure formation of very small dispersed elastomer domains in the hydrophobic liquid. The high shear may be obtained through use of a high shear mixer, such as an Ultra-Turrax® and the like.

In a second step of the method, the elastomer dispersion is mixed with an aqueous solution of an alkali metal silicate to form a mixture.

In one embodiment, the alkali metal silicate is a sodium silicate or potassium silicate. In one embodiment, the alkali metal silicate is a sodium silicate. The sodium silicate includes sodium metasilicate. The sodium silicate may be anhydrous or in various hydrated states.

The aqueuous solution of alkali metal silicate is formed by dissolving a desired amount of alkali metal silicate in water with stirring. In one embodiment, the aqueous solution of alkali metal silicate may have a concentration range of from 1 to 34 percent by weight of alkali metal silicate in water. In one embodiment, the aqueous solution of alkali metal silicate may be of neutral pH or made alkaline through addition of a small amount of base such as dilute sodium hydroxide or dilute potassium hydroxide, or the like.

The aqueous solution of alkali metal silicate is mixed with the elastomer dispersion with stirring to form a mixture of the dispersed elastomer and aqueous alkali metal silicate.

In a third step of the method, a precipitating agent is added to the mixture of dispersed elastomer and aqueous metal silicate to precipitate silica onto the dispersed elastomer. Sufficient precipitating agent is added to the mixture to effect precipitation of a porous silica onto the dispersed elastomer. The amount of added precipitating agent and the rate of addition of the precipitating agent to the mixture are such as to obtain the desired thickness and porosity of silica deposited on the dispersed elastomer, as would be apparent to one skilled in the art without undue experimentation. Such precipitation of silica onto the dispersed elastomer results in formation of particles of porous silica shell at least partially surrounding an elastomer core. In one embodiment, the particles comprise a substantially spherical shell of porous silica completely surrounding a core of elastomer. In one embodiment, the particles comprise a shell of porous silica at least partially surrounding an elastomer core. In general, at least part of the elastomer extends through at least some of the pores of the porous silica.

In one embodiment, the precipitating agent is a surfactant such as cetyl trimethylammonium bromide (CTAB), sodium dioctyl sulfosuccinate (Aerosol® OT), and the like.

In one embodiment, the precipitating agent is an acid such as hydrochloric acid, sulfuric acid, carbonic acid, or alkali metal hydrogen carbonate. In one embodiment, the precipitating agent is an alkali metal hydrogen carbonate. In one embodiment, the precipitating agent is sodium hydrogen carbonate.

In an optional fourth step of the method, a separating agent is added to the mixture including the porous silica precipitated on the dispersed elastomer to aid in separation and removal of the hydrophobic liquid from the particulate composite. In embodiments wherein the precipitating agent also acts as a separating agent, such as with surfactants such as cetyl trimethylammonium bromide and sodium dioctyl sulfosuccinate, no additional separating agent is required. In embodiments wherein the precipitating agent does not act as a separating agent, such as with acid such as hydrochloric acid, sulfuric acid, carbonic acid, or alkali metal hydrogen carbonate, a separating agent is required. In one embodiment, the separating agent is an alcohol including methanol, ethanol, propanol, and butanol, and the like, or a hydrocarbon liquid such as hexane, heptane, benzene, toluene, cyclohexane and the like.

The amount of precipitating agent and (optionally) separating agent added is generally sufficient to fully contact the dispersed elastomer both through the pores of the silica and any not surrounded by the silica. In this way, the elastomer is swelled so as to extend at least part of the elastomer through at least some of the pores of the porous silica. In addition, the volume of separating agent may be sufficient to remove the hydrophobic liquid (such as oil) and water from the mixture. The separating agent is allowed to act on the elastomer for a time sufficient to effect extension of the elastomer in the elastomer core through the pores of the porous silica shell. Such swelling of the elastomer core results in formation of a particulate composite of silica and elastomer comprising particles of porous silica shell at least partially surrounding an elastomer core, with at least part of the elastomer extending through at least some of the pores of the porous silica shell. In one embodiment, the particles comprise a substantially spherical shell of porous silica completely surrounding a core of elastomer, with at least part of the elastomer extending through at least some of the pores of the porous silica shell.

The particles comprising porous silica precipitated on the swelled elastomer may be separated from the swelling agent, hydrophobic liquid and water by separation methods as are known in the art, including decantation, filtration, centrifugation, and the like, followed by drying to obtain the final particulate composite of silica and elastomer.

In one embodiment, the particulate composite of silica and elastomer has a particle size ranging from 0.1 to 1 micrometers.

The particulate composite of silica and elastomer is used in a rubber composition. In one embodiment, the rubber composition comprises from 10 to 150 phr of the particulate composite of silica and elastomer. In one embodiment, the rubber composition comprises from 20 to 100 phr of the particulate composite of silica and elastomer. In one embodiment, the rubber composition comprises from 30 to 90 phr of the particulate composite of silica and elastomer.

The rubber composition may be used with rubbers or elastomers containing olefinic unsaturation. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include up to 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

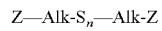

in which Z is selected from the group consisting of

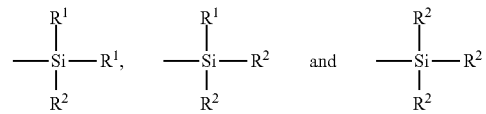

where R$^1$ is an alkyl group of 1 to 4 carbon atoms, cyclohexyl or phenyl; R$^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

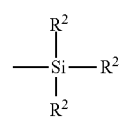

where R$^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition is accomplished in at least three stages, namely, at least two non-productive stages followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). Between mix stages, the temperature of the rubber composition is cooled to a lower temperature. The terms "non-productive" and "productive" mix stages are well known to those having skill in the rubber mixing art. Of significance in the present invention, the treated aramid fiber is added during a second non-productive mix stage. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Mixing of the rubber composition is typically done in suitable rubber mixing apparatus, such as a Banbury mixer or the like.

Following mixing, the rubber composition may be milled, calendared, extruded, or otherwise processed to form a rubber component of a pneumatic tire. The rubber composition may be incorporated in a variety of rubber components of a pneumatic tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

EXAMPLE 1

In this example, the production of a particulate composite of silica and elastomer is illustrated. Four samples of particulate composite of silica and elastomer were produced following essentially the same procedure, described as follows.

Into a 0.6 liter vessel, 50 grams of liquid maleinized styrene-butadiene copolymer elastomer (Cray Valley Ricon 184, with a molecular weight Mn of 9100) was added to 250 ml distilled water and 250 ml of rapeseed oil. The elastomer was then dispersed in the oil using an Ultra-Turrax® with the speed adjusted to maintain the temperature of the dispersion at no more than 50° C. This dispersion was allowed to disperse for about 15 minutes.

The dispersion of elastomer in oil was then added to an aqueous solution of 5 percent by weight of sodium silicate with mixing for about 10 minutes. To this mixture was added with mixing an aqueous solution prepared from 88 grams of CTAB in 1600 ml of distilled water at 50° C. The contents were then allowed to precipitate for about 24 hours.

The resulting particulate composite of silica and elastomer was decanted from the liquid phase and dried to produce the final product.

For a first product, only the maleinized styrene-butadiene copolymer was added to the oil. This product is referred to as Sample 1.

For the second product, maleinized styrene-butadiene copolymer and 12 grams of the antioxidant N-1,3-dimethylbutyl-N'-phenyl-p-phenylenediamine (6PPD) were added to the oil. This product is referred to as Sample 2.

For the third product, only maleinized styrene-butadiene copolymer was added to the oil. After the drying step of silica, 6.5 grams of the silane coupler 3,3'-bis(triethoxysilylpropyl) disulfide was added to allow deposition on the precipitated silica. This product is referred to as Sample 3.

For the fourth product, maleinized styrene-butadiene copolymer and 6.5 grams of a silane coupler 3,3'-bis(triethoxysilylpropyl)disulfide were added to the oil. This product is referred to as Sample 4.

EXAMPLE 2

In this example, the use of a particulate composite of silica and elastomer in a rubber composition is illustrated. Eight rubber compounds were prepared using the products of Example 1, following the general recipe shown in Table 1. All amounts are given in parts by weight, per 100 parts by weight of elastomer (phr). The amounts of the product Samples 1, 2, 3 and 4 added are given in Table 2.

The resulting rubber compounds were cured and tested for various physical properties, as given in Table 3.

TABLE 1

| First Non-Productive Mix Step | |
| --- | --- |
| Styrene-Butadiene[1] | 103.13 |
| Polybutadiene | 25 |
| Carbon Black | 9 |
| Resin | 5 |
| Waxes[2] | 1.5 |
| Stearic Acid | 1 |
| Silica | 50 |
| Second Non-Productive Mix Step | |
| Antidegradant[3] | 3.5 |
| Stearic Acid | 2 |
| Coupling Agent[4] | 6.8 |
| Silica | variable as per Table 2 |
| Silica/Elastomer Composite | variable as per Table 2 |
| Productive Mix Step | |
| Antidegradant[3] | 0.5 |
| Sulfur | 1.4 |
| Zinc Oxide | 2.5 |
| Accelerators[5] | 3.8 |

[1] Extended with 37.5 phr of process oil
[2] microcrystalline and paraffinic
[3] paraphenylene diamine types
[4] 3,3'-bis(triethoxysilylpropyl) disulfide
[5] sulfenamide and guanidine types

TABLE 2

| Sample No. | 5 | 6 | 7 | 8 | 9 | 10 | 11 | 12 |
| --- | --- | --- | --- | --- | --- | --- | --- | --- |
| Silica[6] | 30 | 25 | 20 | 25 | 25 | 20 | 25 | 20 |
| Sample 1[7] | 0 | 5 | 10 | 0 | 0 | 0 | 0 | 0 |
| Sample 2[8] | 0 | 0 | 0 | 5 | 0 | 0 | 0 | 0 |
| Sample 3[9] | 0 | 0 | 0 | 0 | 5 | 10 | 0 | 0 |
| Sample 4[10] | 0 | 0 | 0 | 0 | 0 | 0 | 5 | 10 |

[6] Precipitated silica, obtained as Z1165MP from Rhodia; the amount of added silica was adjusted to maintain a total silica and silica composite sample content of 30 phr.
[7] Sample 1: silica composite with maleinized styrene-butadiene copolymer
[8] Sample 2: silica composite with maleinized styrene-butadiene copolymer and 6PPD
[9] Sample 3: silica composite with maleinized styrene-butadiene copolymer, with silane deposited on silica
[10] Sample 4: silica composite with maleinized styrene-butadiene copolymer and silane

TABLE 3

| Samples | 5 | 6 | 7 | 8 | 9 | 10 | 11 | 12 |
| --- | --- | --- | --- | --- | --- | --- | --- | --- |
| Tensile Properties | | | | | | | | |
| Elongation, % | 511.3 | 479.7 | 491.2 | 468.2 | 433.8 | 483.5 | 446.7 | 451.3 |
| 100% Mod, MPa | 2.4 | 2.3 | 2.1 | 2.3 | 2.4 | 2.1 | 2.5 | 2.3 |
| 300% Mod, MPa | 11.1 | 10.7 | 9.9 | 10.6 | 11.1 | 9.9 | 11.5 | 11.0 |
| Rebound 23° C. | 34.3 | 36.9 | 39.6 | 37.1 | 35.4 | 39.5 | 36.3 | 39.7 |
| Shore A | 69.6 | 66.4 | 62.9 | 66.5 | 69.0 | 63.4 | 68.2 | 64.7 |
| Tensile Str, MPa | 19.9 | 17.6 | 16.9 | 16.9 | 16.0 | 16.6 | 16.8 | 16.6 |
| RPA at 10% strain | | | | | | | | |
| G', MPa | 2.35 | 1.93 | 1.6 | 1.9 | 2.14 | 1.65 | 2.11 | 1.34 |
| G", MPa | 0.29 | 0.21 | 0.15 | 0.2 | 0.25 | 0.17 | 0.23 | 0.1 |
| tan delta | 0.122 | 0.109 | 0.096 | 0.107 | 0.117 | 0.102 | 0.108 | 0.076 |
| MDR2000 @ 150° C. | | | | | | | | |
| T90 (min) | 16.18 | 13.42 | 12.81 | 13.16 | 13.82 | 12.98 | 13.83 | 12.62 |
| Rebound, 100° C. | 62.6 | 66.32 | 68.6 | 67.11 | 65.14 | 68.2 | 65.54 | 69.5 |
| Rebound, 0° C. | 13.5 | 12.83 | 13.29 | 12.83 | 13.09 | 13.77 | 13.03 | 12.83 |

As seen in the data of Table 3, use of the particulate composite of silica and elastomer of the present invention unexpectedly and surprisingly shows improved interaction with rubber in a rubber compound as compared with control silica. Samples 6 and 7 containing 5 and 10 phr, respectively of the particulate composite of silica and elastomer increased rebound and reduced tangent delta as compared with control Sample 5. Increased rebound and reduced tangent delta are indicators of reduced hystereis in a rubber compound and reduced rolling resistance in a tire containing the rubber compound.

While certain representative embodiments and details have been shown for the purpose of illustrating the invention, it will be apparent to those skilled in this art that various changes and modifications may be made therein without departing from the spirit or scope of the invention.

What is claimed is:

1. A method of producing a particulate composite of silica and elastomer comprising the steps of
    dispersing a diene based elastomer in an oil to form an elastomer dispersion consisting essentially of elastomer and oil;
    mixing the elastomer dispersion with an aqueous solution of an alkali metal silicate to form a mixture;
    adding a precipitating agent to the mixture to precipitate a porous silica onto the dispersed elastomer to form a particulate composite of silica and elastomer comprising a porous silica shell at least partially surrounding a core of diene based elastomer; and
    optionally adding a separating agent to remove the oil from the particulate composite.

2. The method of claim 1, wherein the oil is a vegetable oil or a mineral oil.

3. The method of claim 1, wherein the alkali metal silicate is sodium silicate or potassium silicate.

4. The method of claim 1, wherein the precipitating agent is an acid.

5. The method of claim 1, wherein the precipitating agent is sodium hydrogen carbonate.

6. The method of claim 1, wherein the precipitating agent is selected from the group consisting of cetyl trimethylammonium bromide and sodium dioctyl sulfosuccinate.

7. The method of claim 1, wherein the separating agent is an alcohol.

8. The method of claim 1, wherein the separating agent is selected from the group consisting of methanol, ethanol, propanol, and butanol.

9. The method of claim 1, wherein the separating agent is a hydrocarbon liquid.

10. The method of claim 1, wherein the separating agent is a hydrocarbon liquid selected from the group consisting of hexane, heptane, benzene, toluene, and cyclohexane.

11. The method of claim 1, wherein the diene based elastomer is a maleinized styrene-butadiene copolymer elastomer having a molecular weight Mn in a range of from 3000 to 15000.

* * * * *